United States Patent [19]

Clegg

[11] Patent Number: 4,575,196

[45] Date of Patent: Mar. 11, 1986

[54] CONICAL BEAM CONCENTRATOR

[76] Inventor: John E. Clegg, 2320 Keystone Dr., Orlando, Fla. 32806

[21] Appl. No.: 634,155

[22] Filed: Jul. 25, 1984

[51] Int. Cl.⁴ .................. G02B 13/18; G02B 17/00; G02B 27/00

[52] U.S. Cl. .................. 350/432; 350/259; 350/452

[58] Field of Search ............... 350/432, 452, 259, 260

[56] References Cited

U.S. PATENT DOCUMENTS

| | | | |
|---|---|---|---|
| 618,280 | 1/1899 | Manning | 350/259 |
| 2,881,654 | 4/1959 | Toffolo . | |
| 2,882,784 | 4/1959 | Toffolo . | |
| 4,074,704 | 2/1978 | Gellert | 350/452 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Rebecca D. Gass

[57] ABSTRACT

A conical beam concentrator consisting of a stage lens which receives a convergent conical incipient beam of light and emits a concentrated whole beam. The stage lens is mounted on the roof of a building so as to receive a wide convergent beam of diffused sunlight and refract a concentrated beam into the room below as a source of supplemental illumination. The stage lens consists of an apex lens and a series of inset component lenses of increased diameter.

2 Claims, 3 Drawing Figures

CONICAL BEAM CONCENTRATOR

BACKGROUND

There is no prior art which receives a convergent conical beam and emits a concentrated whole beam. Concurrent art includes a *Conical Beam Concentrator* comprising a complete whole convex conical lens instead of separate inset sections. Both concentrators have a code designation of RT:C (R-refracting section of a component lens, T-transmitting section of a component lens, C-concentrating stage lens).

DRAWINGS

DESCRIPTION

Figure 2:
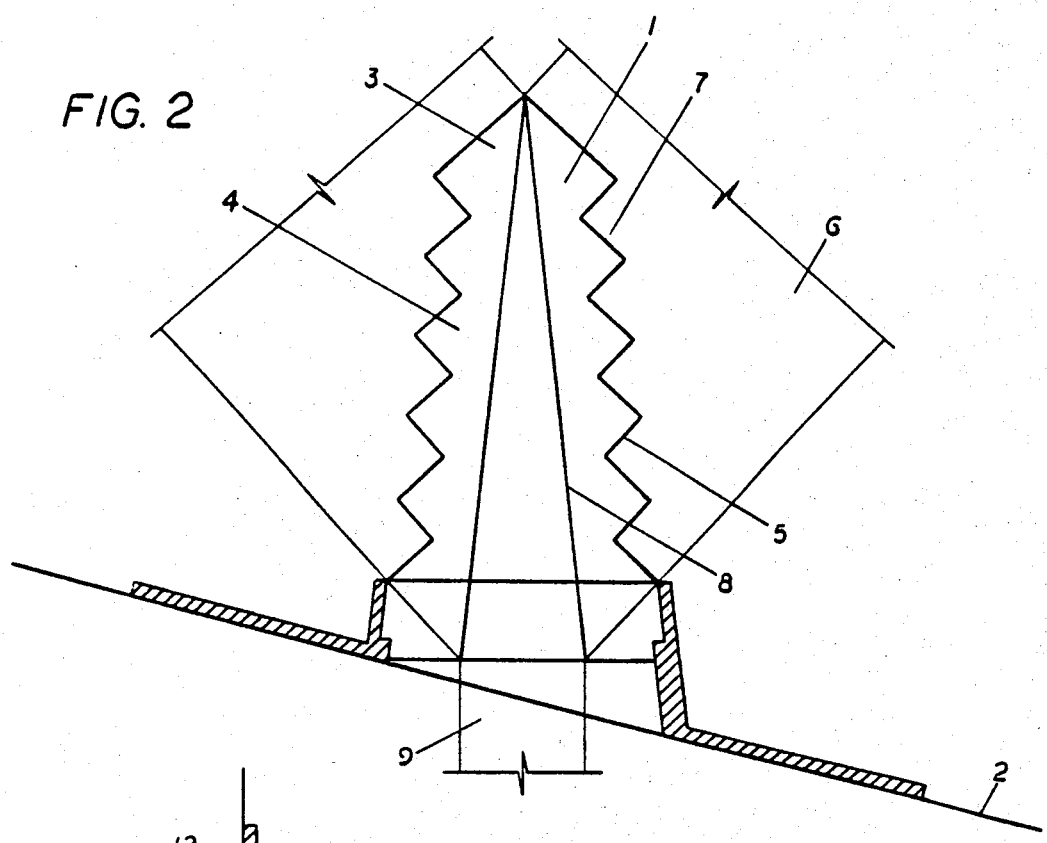
FIG. 2 is an elevation of the concentrator mounted on the sloping roof of a building.

FIG. 2 shows the conical beam concentrator comprising inset lens RT 1 mounted on a sloping roof represented by roof line 2. Inset lens RT 1 consists of apex component lens 3 and a series of five inset components lenses 4 of increased diameters aligned on a vertical axis. Lenses 3 and 4 can be integral as shown or separate. Intermediate walls 5 of lenses 3 and 4 are opaque.

Six convergent conical incipient beams 6 of diffused sunlight are transmitted by six parallel inset convex conical sections 7 and refracted by a concave conical section 8, forming concentrated whole beam 9 which is emitted parallel to the vertical axis. Beam 9 passes through a hole in the roof and is received by an inverted inset lens mounted on the ceiling of the room. The light from a wide convergent conical portion of the sky is projected into the room as supplemental illumination.

Figure 3:
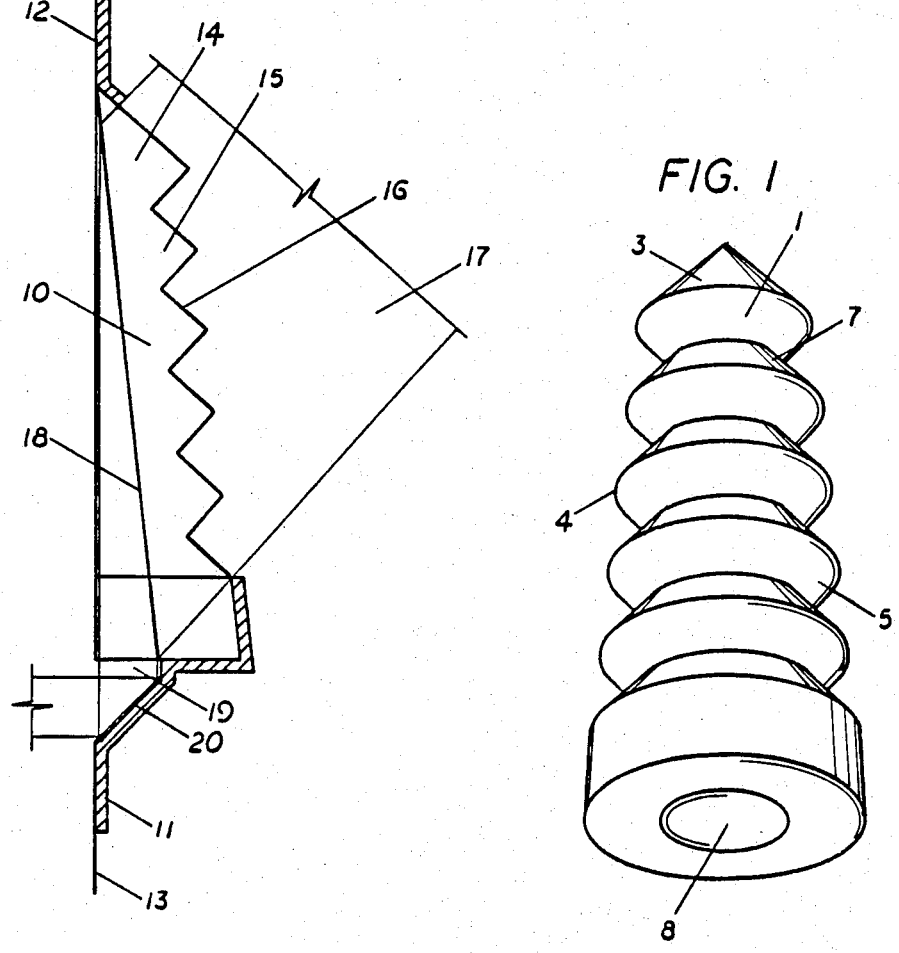
FIG. 3 is an elevation of the longitudinal half lens mounted on the exterior wall of a building.
Figure 1:
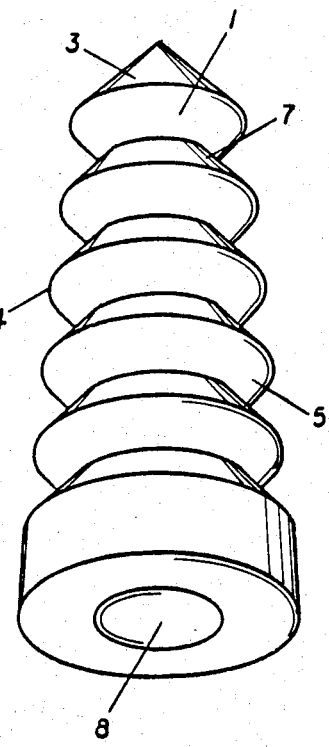
FIG. 1 is a perspective view of the conical beam concentrator.

FIG. 3 shows longitudinal half inset lens RT 10 mounted between base bracket 11 and apex bracket 12 on an exterior wall represented by wall line 13. Lens RT 10 consists of apex component lens 14 and five inset component lenses 15. Six parallel inset convex conical sections 16 transmit convergent conical incipient beams 17 from a 180° sector of the sky through the lens to concave conical section 18, which refracts the beams out of the lens, forming concentrated half beam 19. Beam 19 is emitted parallel to the vertical axis of the lens and then reflected by 45° plane mirror 20 through a hole in the wall to the interior room. The reflected beam can be received by a diffuser or it can be reflected upward into another half inset lens and projected on the ceiling of the room.

I claim:

1. A conical beam concentrator comprising a stage lens RT (1) consisting of an apex component lens (3) and a series of five integral or separate inset component lenses (4) of increased diameters aligned on a vertical axis, with apex component lens (3) and inset component lenses (4) having parallel inset convex conical sections (7) which transmit convergent conical incipient beams (6) through the lenses to concave conical section (8) which refracts beams (6) out of the stage lens RT (1), forming concentrated whole beam (9) which is emitted parallel to the vertical axis.

2. A conical beam concentrator comprising a longitudinal half stage lens RT (10) consisting of an apex component lens (14), a series of five integral or separate half inset component lenses (15) of increased diameters aligned on a vertical axis, and a plane mirror (20) mounted with its reflective surface 45° from vertical, with the apex component lens (14) and inset component lenses (15) having parallel inset convex conical sections (16) which transmit convergent conical incipient beams (17) through the half stage lens RT (10) to a concave conical section (18) which refracts beams (17) out of the lens, forming concentrated half beam (19) which is emitted parallel to the vertical axis and reflected horizontally by mirror (20).

* * * * *